United States Patent
Kim et al.

(10) Patent No.: US 8,560,928 B2
(45) Date of Patent: Oct. 15, 2013

(54) DIVERSITY METHOD USING ERROR CORRECTING CODE

(75) Inventors: Sooyoung Kim, Daejon (KR);
Hee-Wook Kim, Daejeon (KR);
Do-Seob Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 260 days.

(21) Appl. No.: 12/988,310

(22) PCT Filed: Sep. 10, 2008

(86) PCT No.: PCT/KR2008/005332
§ 371 (c)(1),
(2), (4) Date: Oct. 15, 2010

(87) PCT Pub. No.: WO2009/128594
PCT Pub. Date: Oct. 22, 2009

(65) Prior Publication Data
US 2011/0041043 A1    Feb. 17, 2011

(30) Foreign Application Priority Data
Apr. 18, 2008  (KR) .................. 10-2008-0036086

(51) Int. Cl.
*H03M 13/03* (2006.01)
(52) U.S. Cl.
USPC .......................................................... 714/790
(58) Field of Classification Search
USPC ................................. 714/790; 375/211, 267
See application file for complete search history.

(56) References Cited

U.S. PATENT DOCUMENTS

| | | | |
|---|---|---|---|
| 6,247,158 B1 * | 6/2001 | Smallcomb | 714/786 |
| 6,370,669 B1 * | 4/2002 | Eroz et al. | 714/774 |
| 6,961,388 B2 * | 11/2005 | Ling et al. | 375/267 |
| 2002/0101934 A1 * | 8/2002 | Kenney et al. | 375/267 |
| 2009/0041097 A1 * | 2/2009 | Lee et al. | 375/211 |
| 2009/0279633 A1 * | 11/2009 | Lee et al. | 375/267 |

FOREIGN PATENT DOCUMENTS

| | | |
|---|---|---|
| EP | 1 653 629 A1 | 5/2006 |
| KR | 2002-0065866 A | 8/2002 |
| KR | 2006-0111238 A | 10/2006 |
| KR | 2007-0004370 A | 1/2007 |
| WO | WO-02/063778 A1 | 8/2002 |

OTHER PUBLICATIONS

Mohammad Janani et al., "Coded Cooperation in Wireless Communications: Space-Time Transmission and Iterative Decoding", IEEE Transactions on Signal Processing, vol. 52, No. 2, pp. 362-371 Feb. 2004.
"An Efficient Diversity Scheme for a Cooperative Satellite-Terrestrial System", ETRI Journal Editorial and Publication Office, 2007.
S. M. Alamouti, "A Simple Transmit Diversity Technique for Wireless Communications", IEEE Journal on Select Areas in Communications, vol. 16, No. 8, pp. 1451-1458, Oct. 1998.

* cited by examiner

*Primary Examiner* — Scott Baderman
*Assistant Examiner* — Joseph Kudirka
(74) *Attorney, Agent, or Firm* — Rabin & Berdo, P.C.

(57) ABSTRACT

A diversity method using an error correcting code. The diversity method includes creating a mother code by performing error correction coding on an input bit string to be coded, puncturing the created mother code and acquiring an error correcting code including systematic information and partial parity information, and space-time encoding the acquired error correcting code corresponding to each frequency.

8 Claims, 5 Drawing Sheets

DIVERSITY METHOD USING ERROR CORRECTING CODE

TECHNICAL FIELD

The present invention relates to a diversity method using an error correcting code; and, more particularly, to a diversity method using an error correcting code which can maximize a diversity gain by transmitting and recovering a code combining error correction coding technology and space-time coding technology by using a plurality of repeaters such that the performance same as the performance in transmission at a low code rate can be acquired at a high code rate.

This work was supported by the IT R&D program for MIC/IITA [2005-S-014-03, "Development of satellite IMT-2000+technology]".

BACKGROUND ART

As recent development of a communication technology, a satellite communication system can provide diverse services such as video and audio services to a moving user terminal through a satellite. A repeater for reducing dead zones in the satellite communication system is realized on ground.

Satellite Digital Multimedia Broadcasting (DMB) and European Satellite-Digital Multimedia Broadcasting (S-DMB) are representatives as the satellite communication system having a repeater. The repeater is defined as a gap filler in a Korean satellite DMB method and defined as Intermediate Module Repeater (IMR) in a European S-DMB method. A repeater realized in a current satellite communication system includes a simple amplification repeater for amplifying the signal transmitted from the satellite at the same band, and repeating the signal to a user terminal and a frequency conversion repeater for frequency-converting the signal transmitted from the satellite and repeating the signal to the user terminal. In addition, a repeater with a diverse signals processing function as well as the frequency converting function has been developed.

In the satellite communication system described above, the user terminal can receive the signal directly from the satellite or indirectly through the repeater. Since the signal directly transmitted from the satellite and the signal indirectly transmitted through the repeater go through different channel environments, the user terminal can improve receiving performance by applying a diversity technology for simultaneously receiving a plurality of signals transmitted from the satellite and the repeaters.

Conventional diversity technologies realized to be applicable in a general mobile communication system include cooperative relay transmission technology using a repeater and cooperation diversity technology based on presence of errors. Each prior art will be described in detail.

In the cooperative relay transmission technology using the conventional repeater, each terminal functions as a repeater in signal transmission. Therefore, the cooperative relay transmission technology relates to a relay transmission technology for acquiring a diversity gain by receiving a signal from a terminal and a base station. That is, in the conventional cooperative relay transmission technology, since relay stations receive and retransmit an up-link signal of a source terminal, a transmission diversity gain can be acquired in up-link transmission of the terminal having a single antenna. The conventional cooperative relay transmission technology can improve reliability in reception signal processing of the base station as well as the diversity gain by optimally maintaining the number of relay terminals to a specific source terminal by controlling channel quality between the base station and the relay station for determining the relay terminal or distance threshold. The cooperation diversity technology based on presence of errors relates to a diversity method for relaying only a proper signal by checking the presence of errors in the signal received in the repeater. That is, in case of relay of a Multiple-Input Multiple-Output (MIMO) wireless network, the cooperation diversity technology selectively relays only data of no error by checking whether there is any error after decoding the data transmitted from a source according to each stream.

In a conventional diversity method introduced by "Mohammad Janani" as the conventional diversity method using the error correction code, data of an opposite repeater are transmitted between repeaters based on an error correcting code such that a receiver can obtain the diversity gain. However, there is a problem that this method may generate a loss by performing selective transmission after checking whether an error occurs in an opposite repeater.

Especially, most of the conventional cooperative diversity technologies for the terrestrial mobile communications including the above mentioned conventional scheme are based on time division duplexing (TDD) mode, and this is impractical to the satellite communication system.

DISCLOSURE OF INVENTION

Technical Problem

An embodiment of the present invention is directed to providing a diversity method using an error correcting code which can maximize a diversity gain by transmitting and recovering a code combining error correction coding technology and space-time coding technology by using a plurality of repeaters such that the performance same as the performance in transmission at a low code rate can be acquired at a high code rate.

The objects of the present invention are not limited to the above-mentioned ones. Other objects and advantages of the present invention can be understood by the following description, and become apparent with reference to the embodiments of the present invention. It is obvious to those skilled in the art of the present invention that the objects and advantages of the present invention can be realized by the means as claimed and combinations thereof.

Technical Solution

In order to solve the above problem, the present invention transmits and recovers a code combining error correction coding technology and space-time coding technology by using a plurality of repeaters such that the performance same as the performance in transmission at a low code rate can be acquired at a high code rate.

In accordance with an aspect of the present invention, there is provided a diversity method using an error correcting code in a gateway, including: creating a mother code by performing error correction coding on an input bit string to be coded; puncturing the created mother code and acquiring a punctured error correcting code including systematic information and partial parity information; and transmitting the acquired error correcting code.

In accordance with another aspect of the present invention, there is provided a diversity method using an error correcting code in a repeater group, including: recovering a mother code based on the error correcting code transmitted from an external device; creating a punctured error correcting code corresponding to the repeater group based on the recovered mother code; and performing space-time coding on the created error correcting code according to each repeater and transmitting the error correcting code.

In accordance with another aspect of the present invention, there is provided a diversity method using an error correcting code in a user terminal, including: combining signals transmitted at the same frequency among a plurality of signals transmitted from the satellite or the repeaters, respectively; performing space-time decoding on the combined signals and recovering the punctured error correcting codes according to the same frequency, respectively; recovering a mother code by combining the respectively recovered punctured error correcting codes; and extracting an input bit string by decoding the recovered mother code.

Advantageous Effects

As described above, the present invention can maximize a diversity gain by transmitting and recovering a code combining error correction coding technology and space-time coding technology by using a plurality of repeaters such that the performance same as the performance in transmission at a low code rate can be acquired at a high code rate. That is, the present invention does not deteriorate performance while achieving high spectrum efficiency.

BEST MODE FOR CARRYING OUT THE INVENTION

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
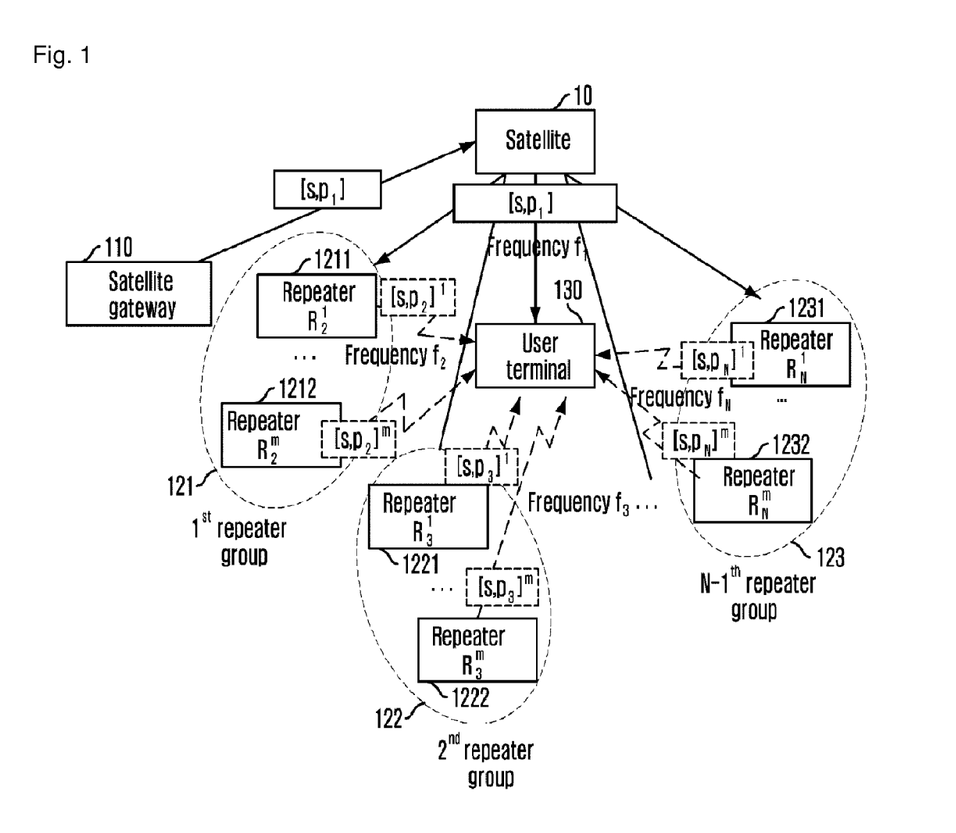
FIG. 1 is a block diagram showing a diversity method using an error correcting code applied to a satellite communication system in accordance with an embodiment of the present invention.

FIG. 1 is a block diagram showing a diversity method using an error correcting code applied to a satellite communication system in accordance with an embodiment of the present invention.

As shown in FIG. 1, the satellite communication system includes a satellite gateway 110, $1^{st}$ to N-$1^{th}$ repeater groups 121 to 123, and a user terminal 130. The $1^{st}$ repeater group 121 includes a repeater $R_2^1$ 1211, . . . , and a repeater $R_2^m$ 1212. Also, the $2^{nd}$ repeater group 122 includes a repeater $R_3^1$ 1221, . . . , and a repeater $R_3^m$ 1222. The N-$1^{th}$ repeater group 123 includes a repeater $R_N^1$ 1231, . . . , and a repeater $R_N^m$ 1232. ••• . . .

The satellite gateway 110 transmits an error correcting code of an R1 code rate including systematic information [s] and partial parity information, e.g., R1=½ or ⅓, to a satellite 10. The error correcting code where an R1 code rate is selectively compatible, i.e., a rate compatible error correcting code, may be used. The rate compatible error correcting code may include the systematic information [s] and the part of the parity information $[p_1, p_2, \ldots, p_N]$.

A mother code is error correcting codes $[s, p_1, p_2, \ldots, p_N]$ including the systematic information [s] and the parity information $[p_1, p_2, \ldots, p_N]$. The systematic information [s] and the partial parity information $[p_i]$ of the rate compatible error correcting code can be decoded without other parity information. Generally published rate compatible error correcting codes may be used in the present invention.

To be specific, the satellite gateway 110 encodes the systematic information [s] to be transmitted according to the error correction coding method and creates error correcting codes $[s, p_1, p_2, \ldots, p_N]$, i.e., mother codes. The satellite gateway 110 punctures the created mother codes $[s, p_1, p_2, \ldots, p_N]$ and transmits the punctured error correcting codes $[s, p_1]$ including the systematic information [s] and the partial parity information $[p_1]$ to the satellite 10. The satellite gateway 110 includes an error correction coding device and functions as a satellite gateway. [s] represents systematic information of the created error correcting code and $[p_1, p_2, \ldots, p_N]$ represent parity information. Those parities can be decoded by independently combining with the systematic information [s].

The satellite 10 transmits the signal transmitted from the satellite gateway 110 to the user terminal 130 and the $1^{st}$ to N-$1^{th}$ repeater groups 121 to 123 such that the user terminal 130 and the $1^{st}$ to N-$1^{th}$ repeater groups 121 to 123 can receive the signal. That is, the satellite 10 transmits the error correcting codes $[s, p_1]$ transmitted from the satellite gateway 110 to the user terminal 130 and the $1^{st}$ to N-$1^{th}$ repeater groups 121 to 123 using a $1^{st}$ frequency $f_1$.

The $1^{st}$ to N-$1^{th}$ repeater groups 121 to 123 receiving the signal create the mother code same as the code created in the satellite gateway 110 based on the received systematic information [s], and adds the partial parity information $[p_i]$ where i indicates any one of 2 to N. The partial parity information can be added using another puncturing pattern, which is not used in the satellite gateway 110. The $1^{st}$ to N-$1^{th}$ repeater groups 121 to 123 perform space-time coding (STC) on the systematic information [s] and the partial parity information $[p_i]$ and transmit the systematic information [s] and the partial parity information $[p_i]$ to the user terminal 130. The $1^{st}$ to N-$1^{th}$ repeater groups 121 to 123 may use a $2^{nd}$ frequency $f_2$ to an $N^{th}$ frequency $f_N$ allocated to the groups. Neighboring repeaters in the same group may use the same frequency. N represents the number of dividable parity informations which can form different rate compatible error correcting codes. The repeater groups using the same $i^{th}$ frequency $f_i$ uses the parity information $[p_i]$ with the systematic information [s] and creates different space-time codes. That is, m repeaters using the same frequency $f_i$ respectively create and transmit different m space-time codes to the user terminal 130.

That is, the $1^{st}$ to N-$1^{th}$ repeater groups 121 to 123 recover the systematic information [s] from the error correcting codes [s, $p_1$] transmitted from the satellite 10, and create error correcting codes [s, $p_1, p_2, \ldots, p_N$] using the same encoding method in the satellite gateway 110. The $1^{st}$ to N-$1^{th}$ repeater groups 121 to 123 puncture the error correcting codes [s, $p_1$, $p_2, \ldots, p_N$] according to the puncturing pattern allocated to each repeater group using the $i^{th}$ frequency $f_i$, and acquire the error correcting codes [s, $p_i$] including the systematic information [s] and the parity information [$p_i$].

For example, the $1^{st}$ repeater group 121 acquires error correcting codes [s, $p_2$] by puncturing error correcting codes [s, $p_1, p_2, \ldots, p_N$] corresponding to the $1^{st}$ repeater group using a $2^{nd}$ frequency $f_2$. The $2^{nd}$ repeater group 122 acquires error correcting codes [s, $p_3$] by puncturing the error correcting codes [s, $p_1, p_2, \ldots, p_N$] corresponding to the $2^{nd}$ repeater group using a $3^{rd}$ frequency $f_3$. The N-$1^{th}$ repeater group 123 acquires error correcting codes [s, $p_N$] by puncturing the error correcting codes [s, $p_1, p_2, \ldots, p_N$] allocated to the N-$1^{th}$ repeater group using the $N^{th}$ frequency $f_N$.

Subsequently, the $1^{st}$ to N-$1^{th}$ repeater groups 121 to 123 create different m space-time codes [s, $p_i$]$^1$ to [s, $p_i$]$^m$ in each repeater based on the error correcting codes [s, $p_i$].

The $1^{st}$ to N-$1^{th}$ repeater groups 121 to 123 transmit the different m space-time codes [s, $p_i$]$^1$ to [s, $p_i$]$^m$ to the user terminal 130 using the $i^{th}$ frequency $f_i$ allocated to each repeater group.

To be specific, the $1^{st}$ repeater group 121 creates m space-time codes [s, $p_2$]$^1$ to [s, $p_2$]$^m$ which are different according to repeaters
$R_2^1$
$, \ldots,$
$R_2^m$
1211 and 1212, based on the error correcting codes [s, $p_2$]. The $1^{st}$ repeater group 121 transmits the different m space-time codes [s, $p_2$]$^1$ to [s, $p_2$]$^m$ to the user terminal 130. For example, the repeater
$R_2^1$
1211 creates a space-time code [s, $p_2$]$^1$ and the repeater
$R_2^m$
1212 creates a space-time code [s, $p_2$]$^m$. Repeaters
$R_3^1$
1221 and
$R_3^m$
1222 included in the $2^{nd}$ repeater group 122 create m space-time codes [s, $p_3$]$^1$ and [s, $p_3$]$^m$, respectively. Repeaters
$R_N^1$
1231 and
$R_N^m$
1232 included in the N-$1^{th}$ repeater group 123 create m space-time codes [s, $p_N$]$^1$ and [s, $p_N$]$^m$. The technology related to space-time coding and decoding will be omitted as a technology publicly known to those skilled in the art. The user terminal 130 performs space-time decoding by combining maximally receivable signals of the signals transmitted from the satellite 10 and the $1^{st}$ to N-$1^{th}$ repeater groups 121 to 123. The user terminal 130 combines the received diverse parity information and decodes the parity information using the combined mother code. The user terminal 130 can divide and receive a plurality of reception signals. The user terminal 130 is a user terminal capable of performing diversity combination with respect to the received signal. The larger the number of receivable signals gets, the larger the diversity gain gets.

In order words, the user terminal 130 performs space-time decoding by combining signals received at the same frequency. That is, the user terminal 130 performs space-time decoding on only the signals received at the same frequency among the signals received through a plurality of paths and recovers the error correcting codes [s $p_i$]. The user terminal 130 combines different error correcting codes [s $p_i$] and decodes the combined error correcting codes to thereby extract the transmitted information and acquire the diversity gain.

For example, the user terminal 130 can acquire the diversity gain based on signals directly transmitted from the satellite 10 and different signals of a maximum of (1+(N-1)×m), which are transmitted from different repeaters 1211 to 1232 included N-1 repeater groups 121 to 123. In the user terminal 130, the received signals can be diversely divided according to signal combination condition and ability.

Figure 2:
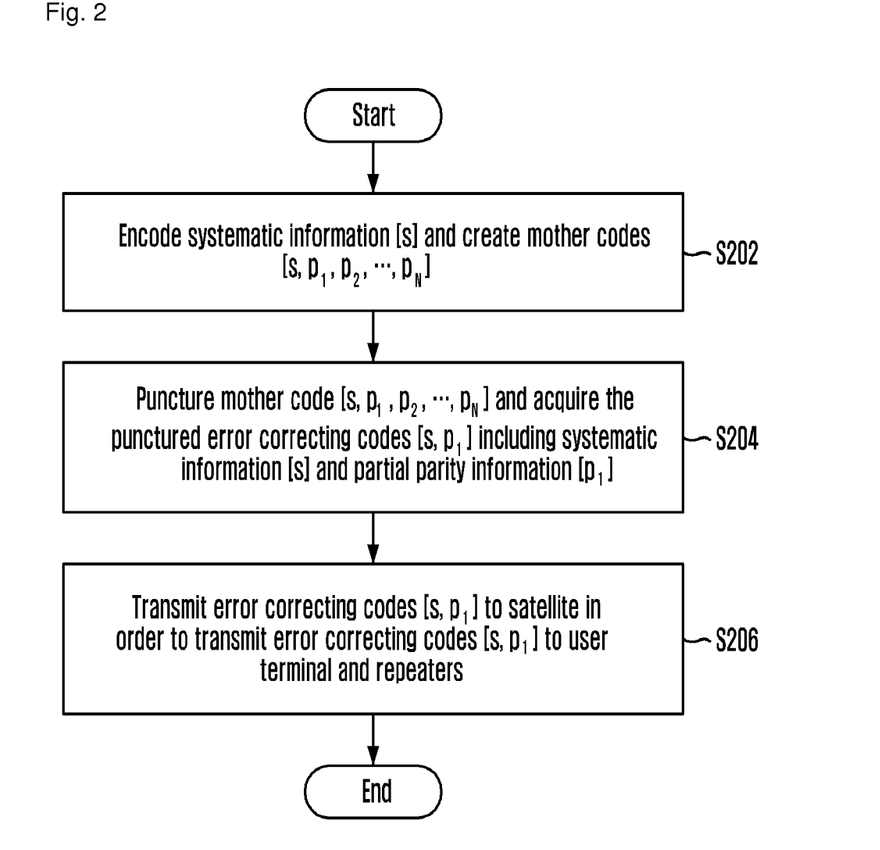
FIG. 2 is a flowchart describing a diversity method using the error correcting code in a satellite gateway in accordance with an embodiment of the present invention.

FIG. 2 is a flowchart describing a diversity method using the error correcting code in the satellite gateway in accordance with an embodiment of the present invention.

At step S202, the satellite gateway 110 encodes systematic information [s] according to the error correction coding method, and creates error correcting codes [s, $p_1, p_2, \ldots, p_N$], i.e., mother codes.

At step S204, the satellite gateway 110 punctures the mother codes [s, $p_1, p_2, \ldots, p_N$] and acquires a punctured error correcting codes [s, $p_1$] including systematic information [s] and partial parity information [$p_1$].

At step S206, the satellite gateway 110 transmits the error correcting codes [s, $p_1$] to the satellite 10. At this time, the satellite 10 transmits the error correcting codes [s, $p_1$] to the user terminal 130 and the repeater groups 121 to 123 using the $1^{st}$ frequency $f_1$.

Figure 3:
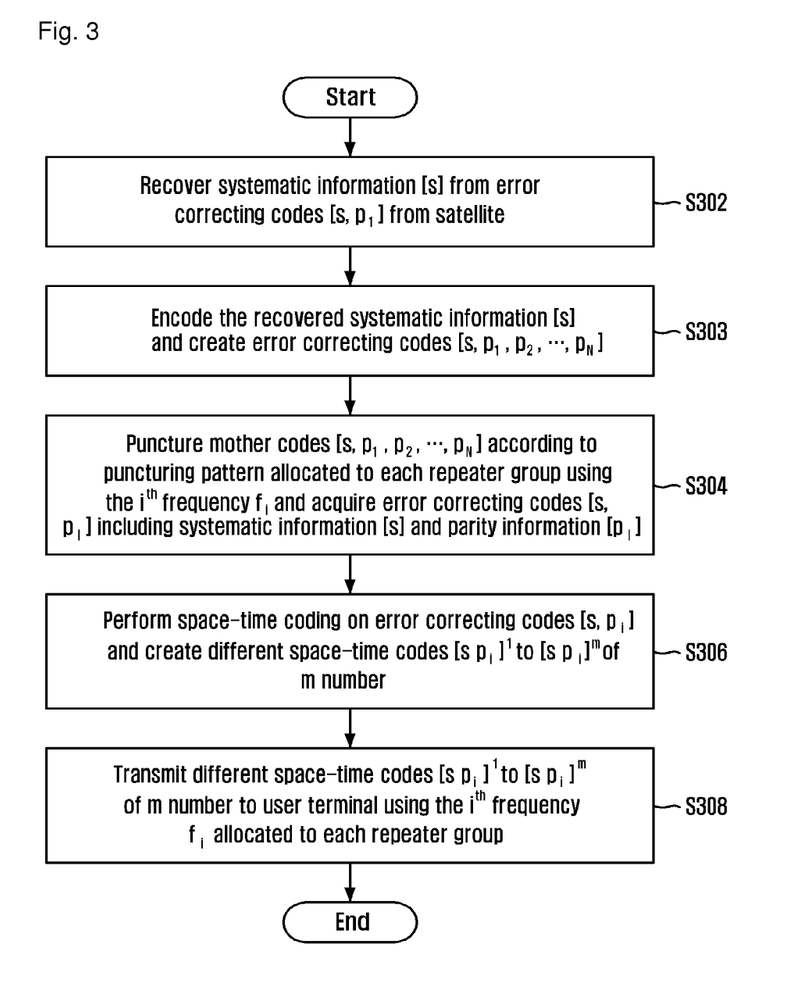
FIG. 3 is a flowchart describing a diversity method using the error correcting code in a repeater group in accordance with an embodiment of the present invention.

FIG. 3 is a flowchart describing a diversity method using the error correcting code in the repeater group in accordance with an embodiment of the present invention.

At step S302, the $1^{st}$ to N-$1^{th}$ repeater groups 121 to 123 recover the systematic information [s] from the error correcting codes [s, $p_1$] from the satellite 10.

At step S303, the $1^{st}$ to N-$1^{th}$ repeater groups 121 to 123 encodes the recovered systematic information [s], and creates error correcting codes [s, $p_1, p_2, \ldots, p_N$].

At step S304, the $1^{st}$ to N-$1^{th}$ repeater groups 121 to 123 puncture the error correcting codes [s, $p_1, p_2, \ldots, p_N$] according to a puncturing pattern allocated to each repeater group using the $i^{th}$ frequency $f_i$, and acquires error correcting codes [s, $p_i$] including the systematic information [s] and the parity information [$p_i$].

At step S306, each repeater performs space-time coding on the error correcting codes [s, $p_i$] in the $1^{st}$ to N-$1^{th}$ repeater groups 121 to 123 and creates m space-time codes [s $p_i$]$^1$ to [s $p_i$]$^m$, respectively.

At step S308, each repeater of m number in the $1^{st}$ to N-$1^{th}$ repeater groups 121 to 123 transmits different space-time codes [s $p_i$]$^1$ to [s $p_i$]$^m$ to the user terminal 130 using the $i^{th}$ frequency $f_i$ allocated to each repeater group.

Figure 4:
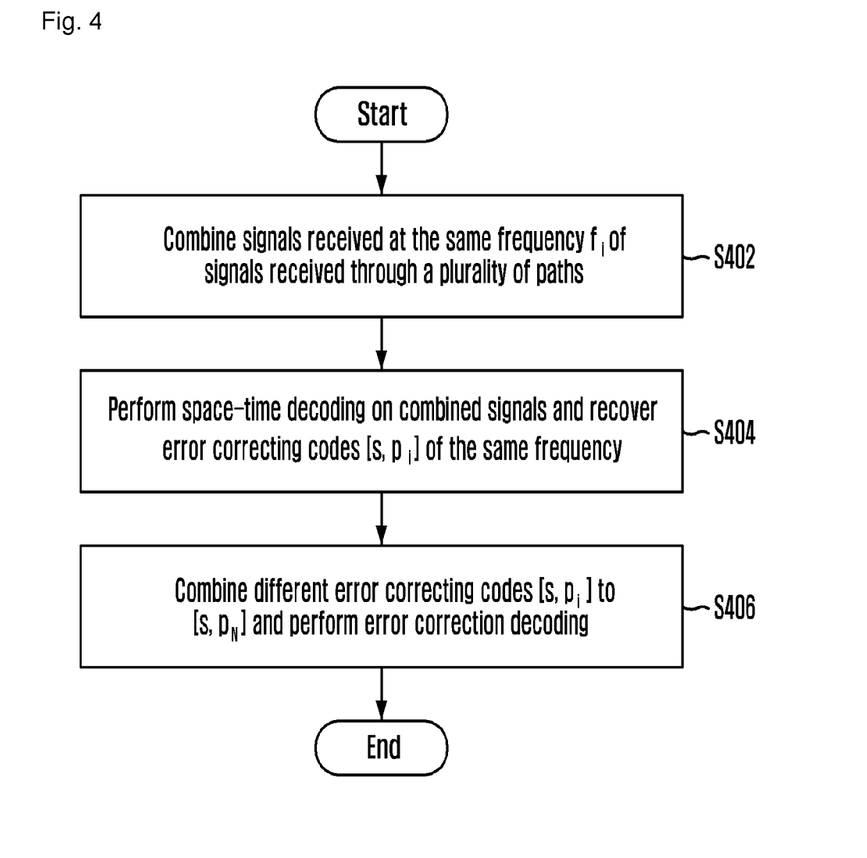
FIG. 4 is a flowchart describing a diversity method using the error correcting code in a user terminal in accordance with an embodiment of the present invention.

FIG. 4 is a flowchart describing a diversity method using the error correcting code in the user terminal in accordance with an embodiment of the present invention.

At step S402, the user terminal 130 combines signals received at the same frequency $f_i$ among the signals received through a plurality of paths. At step S404, the user terminal 130 performs space-time decoding on the combined signals and recovers the error correcting codes [s, $p_i$].

At step S406, the user terminal 130 combines different error correcting codes [s, $p_1$] to [s, $p_N$] and performs error correction decoding. That is, the user terminal 130 acquires the diversity gain by combining different error correcting codes [s p$_i$] with respect to the space-time decoded signals and performing error correction decoding.

Figure 5:
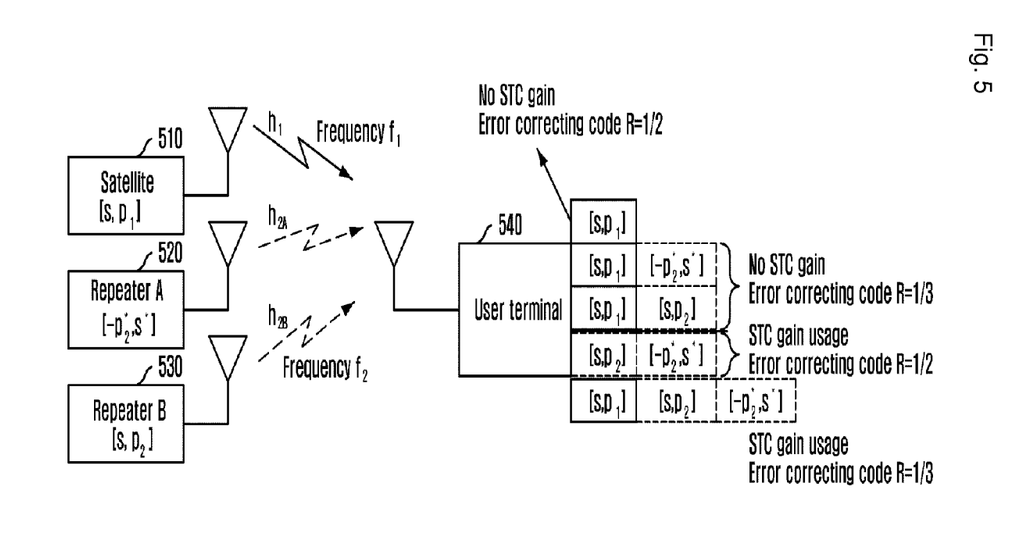
FIG. 5 shows a satellite communication system using two repeaters of the satellite communication systems to which the present invention is applied.

FIG. 5 shows a satellite communication system using two repeaters of the satellite communication systems to which the present invention is applied.

To help understanding, a satellite communication system, where two repeaters 520 and 530 repeats a signal transmitted from a satellite 510 to a user terminal 540 and the user terminal 540 directly receives the signal transmitted from a satellite 510, will be described.

The satellite communication system of FIG. 5 adopts an error correcting code where a code rate is ⅓. The error correcting code having the code rate of ⅓ means an error correcting code having a rate of 1:2 between information to be transmitted and parity information to be additionally transmitted to protect the information. [s] represents systematic informations corresponding to the information to be transmitted. [p$_1$] and [p$_2$] represent parity informations to be additionally transmitted for error correction.

The systematic information and the parity information respectively include a bit string of a systematic bit and a parity bit.

The error correcting code used in the satellite communication system is a rate compatible code. The rate compatible code may be used as a code having a code rate of ½ when only the systematic information [s] and parity information [p$_1$] are transmitted or received. In the same manner, the rate compatible code may be used as the code having the code rate of ½ when there are only the systematic information [s] and the parity information [p$_2$]. Also, a rate compatible code using available systematic information [s], and parity information [p$_1$, p$_2$] is a mother code having a code rate of ⅓.

Meanwhile, the satellite gateway 110 punctures the parity information [p$_2$] of the error correcting codes [s, p$_1$, p$_2$] in the mother code and transmits only the systematic information [s] and parity information [p$_1$] to the satellite 510.

The satellite 510 transmits the error correcting codes [s, p$_1$] transmitted from the satellite gateway 110 to the ground based using the 1$^{st}$ frequency f$_1$. That is, each of the error correcting codes [s, p$_1$] is transmitted to a user terminal 540, the repeater A 520 and the repeater B 530.

The repeater A 520 and the repeater B 530 receive the error correcting codes [s, p1] from the satellite 510, respectively. The repeater A 520 and the repeater B 530 respectively create the other parity information [p$_2$], which is not transmitted in the satellite gateway, based on the systematic information [s] corresponding to the information part of the transmitted error correcting codes [s, p1]. The repeater A 520 and the repeater B 530 encode the systematic information [s] according to the error correction coding method which is the same method used in the satellite gateway. That is, the repeater A 520 and the repeater B 530 create the mother codes [s p$_1$, p$_2$] based on the systematic information [s] to transmit the error correcting codes [s p2] by puncturing p$_1$.

Subsequently, the repeater A 520 and the repeater B 530 respectively perform space-time coding on the systematic information [s] and the created parity information [p$_2$] and transmit the coded result to the user terminal 540. For example, the repeater A 520 performs space-time coding on the systematic information [s] and the created parity information [p$_2$] and transmits the error correcting codes [s p2] to the user terminal 540. On the other hand, the repeater B 530 performs space-time coding on the systematic information [s] and the created parity information [p$_2$] and transmits error correcting codes [−p*$_2$, s*] to the user terminal 540. The notation "*" represents a complex conjugate.

Meanwhile, the user terminal 540 receives diverse signals with different frequencies according to the environments where the user is included.

First, a case where the user terminal 540 is located in a remote rural area, where repeaters can hardly be found, will be described. In this environment, the user terminal 540 usually receives only the error correcting codes [s p$_1$] transmitted from the satellite using the 1$^{st}$ frequency f$_1$. That is, the user terminal 540 receives the error correcting codes [s p$_1$] from the satellite 510 in the remote rural area. Accordingly, the user terminal 540 performs error correction decoding based on the error correcting codes [s p$_1$] having a code rate of ½.

Second, the user terminal 540 located in a complex urban environment, where a direct signal from the satellite can hardly be received, will be described as follows. In this environment, the user terminal 540 usually can not receive the error correcting codes [s p$_1$] transmitted from the satellite 510. On the other hand, the user terminal 540 receives the signals from the repeater A 520 and/or the repeater B 530. That is, the user terminal 540 performs space-time decoding based on the space-time encoded error correcting codes [s p2] and [−p*$_2$, s*] transmitted from the repeaters A 520 and B 530 using frequency f$_2$, and recovers the error correcting codes [s p2]. The user terminal 540 performs decoding based on the error correcting codes [s p2] having the code rate of ½.

Third, the user terminal 540 in an environment where it can receive signals both from the satellite using frequency f$_1$ and from the repeaters using frequency f$_2$, will be described as follows. In this environment, the user terminal 540 receives the error correcting codes [s p$_1$] transmitted at the 1$^{st}$ frequency f$_1$ and receives the space-time encoded error correcting codes [s p2] and [−p*$_2$, s*] transmitted at the 2$^{nd}$ frequency f$_2$. The user terminal 540 receives the space-time encoded error correcting codes [s p2] and [−p*$_2$, s*] from the repeater A 520 and the repeater B 530, performs space-time decoding and recovers the error correcting codes [s p2]. Subsequently, the user terminal 540 combines the received error correcting codes [s p$_1$] with the recovered error correcting codes [s p2] and acquires mother codes [s, p$_1$, p$_2$]. The user terminal 540 performs error correction decoding based on the mother codes [s, p$_1$, p$_2$] having the code rate of ⅓. As a subset of this case, when the user terminal 540 receives the error correcting codes [s p$_1$] transmitted at the 1$^{st}$ frequency f$_1$ and receives only one of the space-time encoded error correcting codes [s p2] and [−p*$_2$, s*] transmitted at the 2$^{nd}$ frequency f$_2$, the user terminal 540 forms the mother codes [s, p$_1$, p$_2$] by combining [s p$_2$] and [s p$_1$] without a space-time coding gain combining [s p$_2$] and [−p*$_2$, s*] and performs error correction decoding at the code rate of ⅓.

Therefore, when a signal is transmitted according to the diversity method, the satellite gateway transmits the signal with the error correcting code having the code rate of ½. The user terminal 540 can receive the signal with the error correcting code having the code rate of ⅓ achieving high coding and diversity gains.

As described above, the technology of the present invention can be realized as a program. A code and a code segment forming the program can be easily inferred from a computer programmer of the related field. Also, the realized program is stored in a computer-readable recording medium, i.e., information storing media, and is read and operated by the computer, thereby realizing the method of the present invention. The recording medium includes all types of recording media which can be read by the computer.

The present application contains subject matter related to Korean Patent Application No. 2008-0036086, filed in the Korean Intellectual Property Office on Apr. 18, 2008, the entire contents of which are incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. A diversity method using an error correcting code, for use in a communication system including a plurality of repeater groups, each of the plurality of repeater groups including a plurality of repeaters, comprising:

receiving the error correcting code transmitted from an external device;

recovering a mother code from the received error correcting code;

creating, for each of the plurality of repeater groups, another error correcting code corresponding to said each repeater group based on the recovered mother code; and performing space-time coding on the created error correcting code according to each of the plurality of repeaters in said each repeater group and transmitting the space-time coded error correcting code.

2. The diversity method of claim 1, wherein the another error correcting code allocated to said each repeater group is created as a rate compatible error correcting code by puncturing the recovered mother code.

3. The diversity method of claim 2, wherein a plurality of different space-time codes are created by performing the space-time coding on the created rate compatible error correcting code according to said each of the plurality of repeaters in said each repeater group.

4. The diversity method of claim 3, wherein the created space-time codes are transmitted at a frequency allocated to said each repeater group, and a different frequency is allocated to each of the plurality of repeater groups.

5. A diversity method using an error correcting code in a user terminal, for use in a communication system having a satellite and a plurality of repeaters, comprising:

receiving a plurality of signals transmitted from the satellite and the plurality of repeaters;

combining the plurality of signals into a plurality of signal groups, each signal group corresponding to a frequency and including ones of the plurality of signals transmitted at the frequency;

performing space-time decoding on each of the plurality of signal groups and recovering error correcting codes for the corresponding frequency;

recovering a mother code by combining the recovered error correcting codes; and extracting an input bit string by decoding the recovered mother code.

6. The diversity method of claim 5, wherein the ones of the plurality of signals in each of the plurality of signal groups are transmitted from a plurality of repeaters.

7. The diversity method of claim 5, wherein the mother code is recovered by combining systematic information of the recovered error correcting codes.

8. The diversity method of claim 5, wherein the mother code is recovered by checking parity information of the recovered error correcting codes.

* * * * *